United States Patent [19]

Nanjyo et al.

[11] Patent Number: 4,999,904
[45] Date of Patent: Mar. 19, 1991

[54] METHOD OF MANUFACTURE OF MAGNETIC HEAD

[75] Inventors: Shinichi Nanjyo; Masahiko Yamazaki, both of Miyagi, Japan

[73] Assignee: Sony Corporaiton, Tokyo, Japan

[21] Appl. No.: 543,498

[22] Filed: Jun. 26, 1990

[30] Foreign Application Priority Data

Jun. 27, 1989 [JP] Japan .................................. 1-164556

[51] Int. Cl.$^5$ .............................................. G11B 5/42
[52] U.S. Cl. ...................................... 29/603; 360/121
[58] Field of Search .................. 29/603; 360/121, 125, 360/127, 124

[56] References Cited

U.S. PATENT DOCUMENTS 4,425,701 1/1984 Takahashi et al. ................... 29/603

FOREIGN PATENT DOCUMENTS 231711 12/1988 Japan .

Primary Examiner—Carl E. Hall
Attorney, Agent, or Firm—Hill, Van Santen, Steadman & Simpson

[57] ABSTRACT

A method for manufacture of a bulk-type magnetic head capable of performing a frame recording operation. A pair of magnetic core blocks with magnetic gaps formed in butt surfaces thereof are slit and comb-toothed to produce a pair of head element couplers, and such element couplers are joined to each other in a state where the comb-toothed portions of one coupler are inserted into the slits in the other coupler while the respective coupling portions are butted to each other, whereby the in-line precision of the magnetic gaps can be enhanced.

1 Claim, 9 Drawing Sheets

METHOD OF MANUFACTURE OF MAGNETIC HEAD

BACKGROUND OF THE INVENTION

1. Field of the Invention

The present invention relates to a method for manufacture of a magnetic head adapted to perform a frame recording operation in an electronic still camera or the like.

2. Description of the Prior Art

In a conventional magnetic head designed for use in an electronic still camera or the like to record frames of still images on a video floppy disk, the track-to-track interval is as small as 40 microns or so for attaining a high recording density, so that the requisite for precision is rendered extremely strict. For the magnetic head having a frame recording capability, it has been customary heretofore to employ a thin film type where magnetic gaps are arrayed in a straight line on one substrate. Since two channels in such thin-film type magnetic head are formed simultaneously on a single substrate by the thin film forming technique, the advantage is achieved that a satisfactory in-line accuracy can be ensured between the two-channel gaps and the electromagnetic characteristics thereof are rendered uniform. Accordingly no phase deviation occurs between the magnetic gaps, and any loss derived from the phase deviation of recorded and reproduced signals can be eliminated. Furthermore, due to the application of a high-precision thin film forming technique, the dimensional precision is retained and a narrow track interval can be realized.

However, in such a conventional thin-film type magnetic head, there exist some drawbacks, viz., production cost is high because of the high precision thin film forming process, and the steps thereof are complicated causing an additional increase in the cost.

In an attempt to solve the above problems, it has been proposed to use a bulk-type magnetic head which is producible at a lower cost. This type, however, has a difficulty in arraying the magnetic gaps of individual head elements in a straight line with a high precision, so that the problems of in-line error and phase deviation are raised. Furthermore, it is necessary in the bulk-type magnetic head to wind coils therein, which raises a problem relative to the coil winding space, and a failure in development of a narrow track structure. With regard to the conventional magnetic heads proposed for solving the above problems, there is known one example as disclosed in Japanese Patent Laid-open No. 63 (1988)-231711.

In the above exemplary magnetic head, track-width limit grooves are formed in one magnetic core half or block to shape two magnetic-gap forming surfaces on a single plane, and the other magnetic core halves, prepared individually with coil grooves formed therein, are joined to each other in such a manner that the respective magnetic-gap forming surfaces are mutually connected, thereby producing a two-channel magnetic head.

In the magnetic head thus produced, the magnetic gaps are formed on a single plane, so that the in-line precision of the gaps can be enhanced. And since the mutually confronting portions of the other magnetic core halves with coil grooves formed therein are inclined in the direction to recede from each other, a wide interval can be obtained between the mutually confronting magnetic core halves to consequently ensure a sufficient space required for winding coils in the grooves.

However, in the above known magnetic head where the magnetic core halves on one side are joined to each other, there is a disadvantage with respect to its crosstalk characteristics. In addition, although a sufficient space can be ensured for winding coils, the coil grooves exist in the same direction and therefore the coil winding operation is somewhat intricate and difficult.

OBJECTS AND SUMMARY OF THE INVENTION

The present invention has been accomplished in view of the problems mentioned. And, its object is to provide an improved magnetic head manufacturing method which is adapted for enhancing the in-line precision of magnetic gaps and realizing a narrow track structure while ensuring a sufficient coil-winding space with further advantages of superior cross-talk characteristics and lower production cost.

In manufacture of a bulk-type magnetic head capable of performing a frame recording operation, a feature of the present invention resides in that a pair of magnetic core blocks with magnetic gaps formed in butt surfaces thereof are slit and comb-toothed to produce a pair of head element couplers, and such element couplers thus obtained are joined to each other in a state where the comb-toothed portions of one coupler are inserted into the slits in the other coupler while the respective coupling portions are butted to each other, whereby the in-line precision of the magnetic gaps can be enhanced.

According to one aspect of the present invention, there is provided an improved magnetic head manufacturing method which comprises the steps of: joining first magnetic core blocks, where track-width limit grooves and coil grooves orthogonal thereto are formed in butt surfaces, to second magnetic core blocks where track-width limit grooves to be opposed to those in the first magnetic core blocks are formed in butt surfaces, the second magnetic core blocks being shorter than the first magnetic core blocks in the direction of extension of the track-width limit grooves; cutting the second magnetic core blocks in such a manner that the thickness of at least the portions thereof opposed to the coil grooves in the first magnetic core blocks become smaller than the depth of the coil grooves; slitting and comb-toothing the joined first and second magnetic core blocks so that at least the second magnetic core blocks are divided and the first magnetic core blocks are partially left uncut to serve as coupling portions, thereby producing a pair of head element couplers; joining the pair of head element couplers to each other in a state where the comb-toothed portions of one head element coupler are inserted into the slits in the other head element coupler while the respective butt surfaces of the first magnetic core blocks are butted to each other; and severing at least the coupling portions of the first magnetic core blocks and thereby dividing the same into individual magnetic heads.

Other objects and features of the present invention will become apparent from the following description which will be given with reference to the illustrative accompanying drawings.

BRIEF DESCRIPTION OF THE DRAWINGS

FIGS. 1 through 6 are enlarged perspective views of principal components showing sequential steps in the process of manufacturing a magnetic head according to the present invention, in which FIG. 1 shows a step of joining first and second magnetic core blocks together, FIG. 2 shows a step of cutting the second magnetic core blocks opposed to coil grooves, FIG. 3 shows a step of producing head element couplers, FIG. 4 shows a step of joining the pair of head element couplers to each other, FIG. 5 shows a step of determining the widths of comb-toothed portions, and FIG. 6 shows a step of severing the coupling portions of magnetic core blocks;

DESCRIPTION OF THE PREFERRED EMBODIMENT

Hereinafter an exemplary embodiment for implementing the magnetic head manufacturing method of the present invention will be described with reference to the accompanying drawings.

Figure 1:
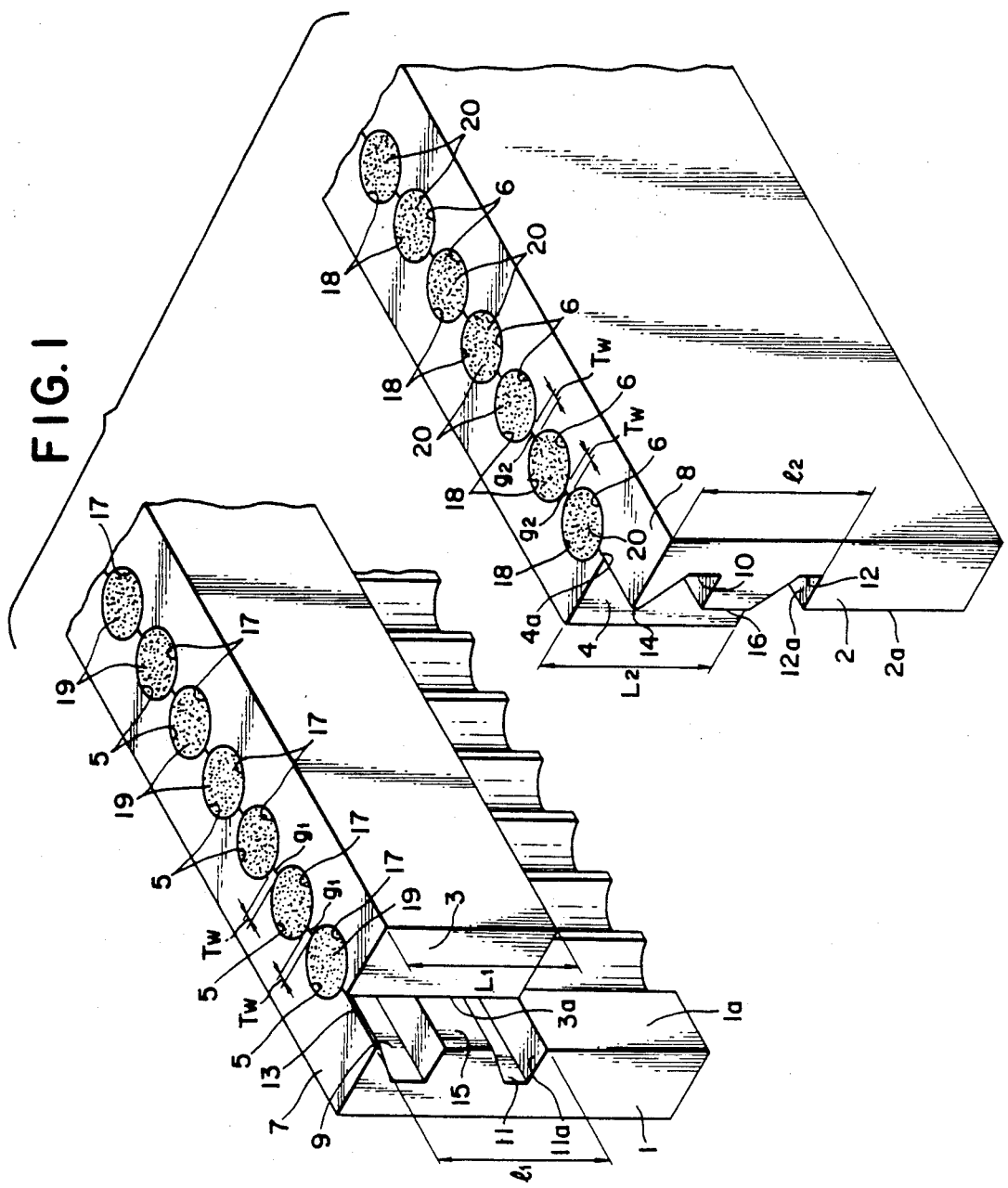

In manufacture of a magnetic head according to this embodiment, as shown in FIG. 1, there are initially prepared two first magnetic core blocks 1, 2 and two second magnetic core blocks 3, 4 having mutually different lengths. The magnetic core block 1, 2, 3, 4 are composed of an oxide magnetic material such as Mn-Zn ferrite or Ni-Zn ferrite.

In this embodiment, the lengths L1, L2 of the second magnetic core blocks 3, 4 are set to be substantially equal to distances El, 22 from recording-medium slide surfaces 7, 8 of the first magnetic core blocks 1, 2 to rear lateral surfaces 11a, 12a of undermentioned glass grooves 11, 12.

Subsequently, a plurality of track-width limit slots 5, 6 are formed longitudinally along butt surfaces 1a, 2a of the whole first magnetic core blocks 1, 2 which are greater in length. In this stage, the slots 5, 6 are so formed as to have predetermined intervals transversely.

As a result, the width of the butt surfaces 1a, 2a left partially in the first magnetic core blocks 1, 2 is determined by the mutually adjacent track-width limit slots 5, 6, thereby defining the track width Tw of each magnetic gap.

In the next step, coil grooves 9, 10 are formed orthogonally to the track-width limit slots 5, 6 in the entire blocks transversely in the vicinities of the recording-medium slide surfaces 7, 8, and glass grooves 11, 12 are formed adjacently thereto on the rear side in a manner to extent over the entire blocks transversely. Such coil grooves 9, 10 and glass grooves 11, 12 are cut to be substantially trapezoidal in sectional shape. And particularly the coil grooves 9, 10 serve to determine the depth of the magnetic gap which will be described later.

As a result, the flat portions between the recording-medium slide surfaces 7, 8 and the coil grooves 9, 10 are used as front gap forming planes 13, 14, and the flat portions between the coil grooves 9, 10 and the glass grooves 11, 12 are used as back gap forming planes 15, 16.

Meanwhile in the butt surfaces 3a, 4a of the second magnetic core blocks 3, 4 to be opposed to the butt surfaces 1a, 2a of the first magnetic core blocks 1, 2, a plurality of track-width limit slots 17, 18 for determining the track width Tw are formed longitudinally over the entire blocks in such a manner as to confront the track-width limit slots 5, 6 formed previously in the first magnetic core blocks 1, 2.

Although the track-width limit slots 5, 6, 17, 18 in this embodiment are shaped to be substantially arcuate, such slots may be sectionally V or any other suitable shape in conformity with the requisite characteristics of the magnetic head.

Next, the first magnetic core blocks 1, 2 and the second magnetic core blocks 3, 4 are butted to each other with the tracks being positioned. In this stage, it is necessary that a gap film of a predetermined gap length be existent between the butt surfaces 1a, 2a of the first magnetic core blocks 1, 2 and the butt surfaces 3a, 4a of the second magnetic core blocks 3, 4. When such gap film is formed by the use of a welding glass material, the butting is executed while interposing between the surfaces a gap spacer or the like which corresponds to the desired gap length. In case the gap film is composed of a thin film, first the front gap forming planes 13, 14 are polished to be specular, and then a non-magnetic material such as $SiO_2$, $Ta_2O_5$, $ZrO_2$, Cr, Be-Cu alloy is deposited by the technique of vacuum thin film forming in a manner to reach the desired gap length.

In this embodiment, the second magnetic core blocks 3, 4 are mutually so butted as to partially leave the butt surfaces 1a, 2a of the first magnetic core blocks 1, 2 in the vicinities of the two ends, thereby facilitating the operation for butting a pair of head element couplers which will be described later.

Subsequently, the spaces between the opposed track-width limit slots 5, 6, 17, 18 are filled with welding glass materials 19, 20, whereby the first magnetic core blocks 1, 2 and the second magnetic core blocks 3, 4 are joined together respectively.

Consequently, magnetic gaps g1 g2 each having a track width Tw are formed between the track-width limit slots 5, 6, 16, 17.

The welding glass fillers 19, 20 need to have adequate properties which are capable of ensuring a sufficient joining strength between the first magnetic core blocks 1, 2 and the second magnetic core blocks 3, 4 while minimizing the bubbles generated during the welding step, and still maintaining a high reliability with minimum corrosion and so forth to the first and second magnetic core blocks 1, 2 and 3, 4.

Figure 2:
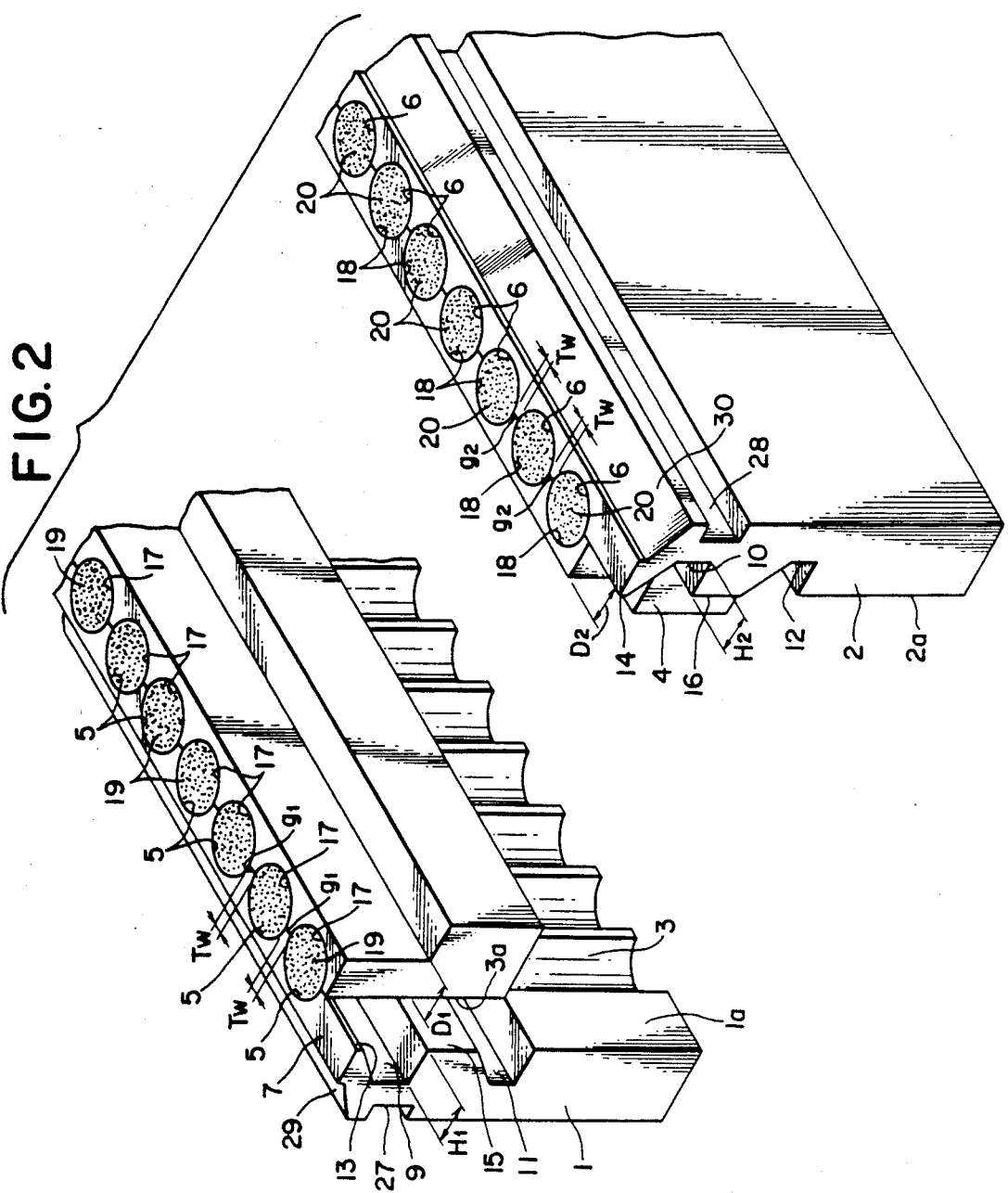

In the next step, as shown in FIG. 2, the second magnetic core blocks 3, 4 are cut off at least in the portions opposed to the coil grooves 9, 10 formed in the first magnetic core blocks 1, 2. And then the second magnetic core blocks 3, 4 are so cut that the thicknesses D1, D2 thereof become smaller than the depths H1, H2 of the coil grooves 9, 10.

Figure 3:
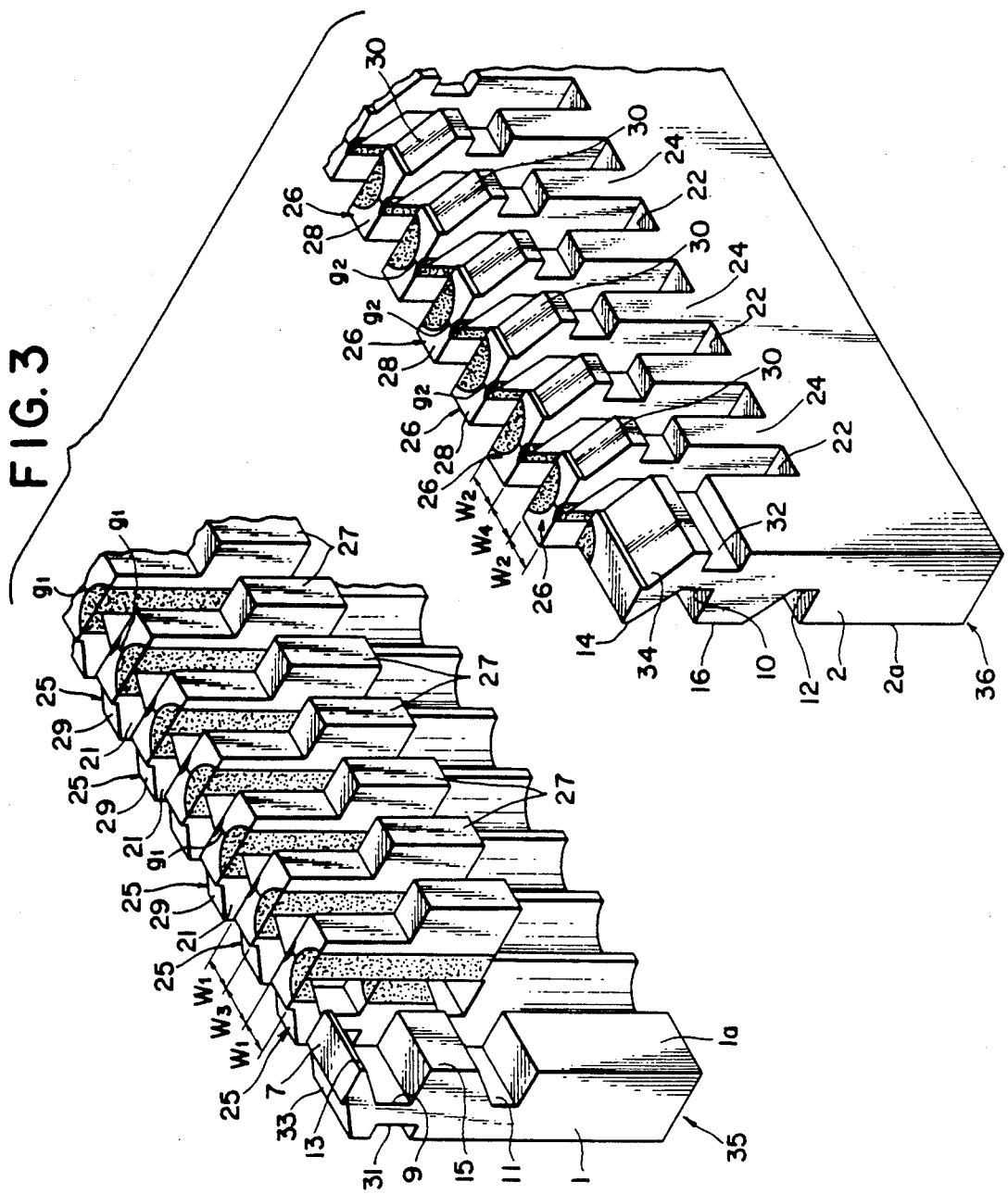

Next, as shown in FIG. 3, the first and second magnetic core blocks 1, 2 and 3, 4 thus joined are so machined that slits extend longitudinally, whereby the pairs of such blocks are shaped like comb teeth. Such slits are formed to have predetermined intervals transversely.

In this stage, the slits 21, 22 are formed at least to the positions where the second magnetic core blocks 3, 4 are divided, and the first magnetic core blocks 1, 2 are partially left uncut to serve as coupling portions 23, 24, wherein the widths W1, W2 of the comb-toothed portions 25, 26 left between such slits 21, 22 are smaller than the widths W3, W4 of the slits 21, 22.

As a result, the second magnetic core blocks 3, 4 are divided and comb-toothed by the slits 21, 22 to consequently become magnetic cores 27, 28 which partially constitute magnetic head elements on one side. Meanwhile the first magnetic core blocks 1, 2 are also comb-toothed by the slits 21, 22 to consequently become magnetic cores 29, 30 which partially constitute magnetic head elements on the other side. That is, the comb-toothed portions 25, 26 are used as magnetic head elements, wherein closed magnetic paths having predetermined magnetic gaps g1 g2 are formed by the magnetic cores 27, 28, 29, 30.

In this embodiment, the slits 21, 22 are cut to the positions deeper than the rear lateral surfaces 11a, 12a of the glass grooves 11, 12.

Subsequently, on the reverse side with respect to the coil grooves 9, 10 in the first magnetic core blocks 1, 2, auxiliary coil grooves 31, 32 are formed at positions corresponding to the coil grooves 9, 10 so that coils can be wound with facility.

Furthermore, for determining the width of contact with the recording medium, the recording-medium slide surfaces 7, 8 of the first magnetic core blocks 1, 2 are partially inclined to form oblique surfaces 33, 34.

Figure 4:
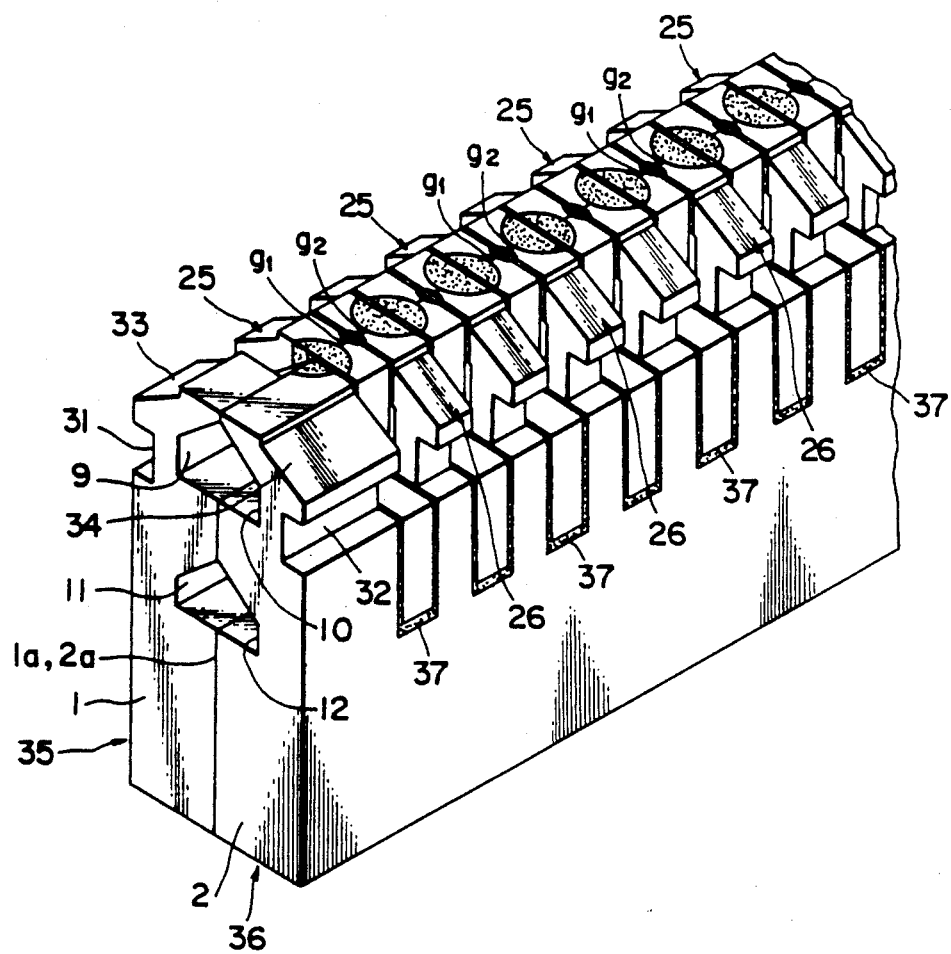

In the next step, the pair of comb-toothed head element couplers 35, 36 are so disposed that, as illustrated in FIG. 4, the comb-toothed portions 25 of one head element coupler 35 are alternately inserted into the slits 22 in the other head element coupler 36. In this stage, such insertion is executed up to the positions where, in the head element couplers 35, 36, the butt surfaces 1a, 2a of the coupling portions 23, 24 of the first magnetic core blocks 1, 2 without joint of the second magnetic core blocks 3, 4 thereto are butted to each other.

Therefore, simultaneously with mutual setting of the butt surfaces 1a, 2a of the first magnetic core blocks 1, 2, the magnetic gaps g1 g2 formed in the comb-toothed portions 25, 26 are aligned straight in the direction of the track width on the butt surfaces 1a, 2a. That is, in the step of butting such head element couplers 35, 36, the butt surfaces 1a, 2a of the coupling portions 23, 24 of the first magnetic core blocks 1, 2 serve to determine the relative positions between the comb-toothed portions 25 of one head element coupler 35 and the comb-toothed portions 26 of the other head element coupler 36. In this stage, since the magnetic gap forming planes in the comb-toothed portions 25, 26 are flush with the butt surfaces 1a, 2a of the coupling portions 23, 24, it follows that the magnetic gaps g1 g2 of the comb-toothed portions 25, 26 can be aligned by rendering the butt surfaces 1a, 2a of the coupling portions 23, 24 coincident with each other. Therefore it becomes possible to prevent any phase deviation between the magnetic gaps g1 g2 while eliminating any loss derived from the phase deviation of recorded and reproduced signals.

Subsequently the pair of head element couplers 35, 36 are joined to each other in such a state by the use of welding glass material 37.

As a result, there is obtained a multi-track magnetic head where a plurality of magnetic gaps are arrayed in a straight line. It is a matter of course that the above is actually usable as a multi-track magnetic head when coils are wound therein.

Figure 5:
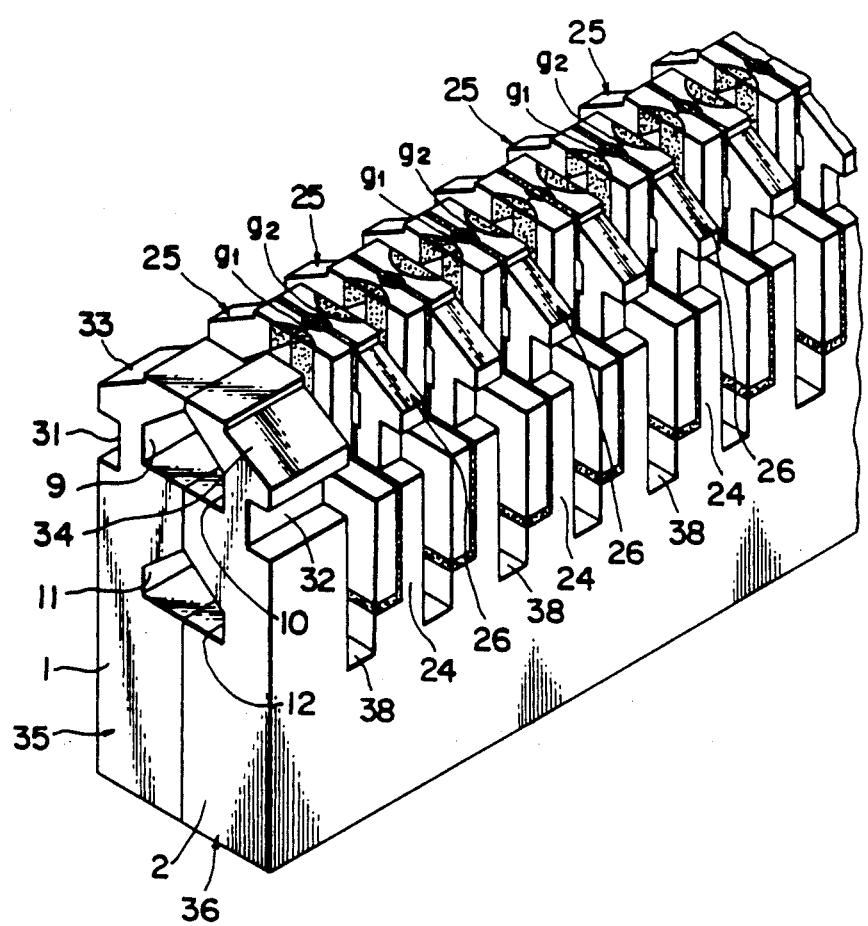

Next, as shown in FIG. 5, the comb-toothed portions 25, 26 of the head element couplers 35, 36 are so cut as to have predetermined widths W1, W2 in the direction of the track width. In this stage, the cutting is executed in such a manner that slits 38 extend up to positions deeper than the magnetic cores 26, 27 on the aforementioned one side.

In this embodiment, the comb-toothed portions 25, 26 are so shaped in this stage as to have predetermined widths in the direction of the track width. However, the comb-toothed portions 25, 26 may be previously shaped in the step of FIG. 3 to have the widths W1, W2.

Finally the coupling portions 23, 24 of the first magnetic core blocks 1, 2 of the joined head element couplers 35, 36 are severed in the longitudinal direction thereof over the entire blocks.

Figure 6:
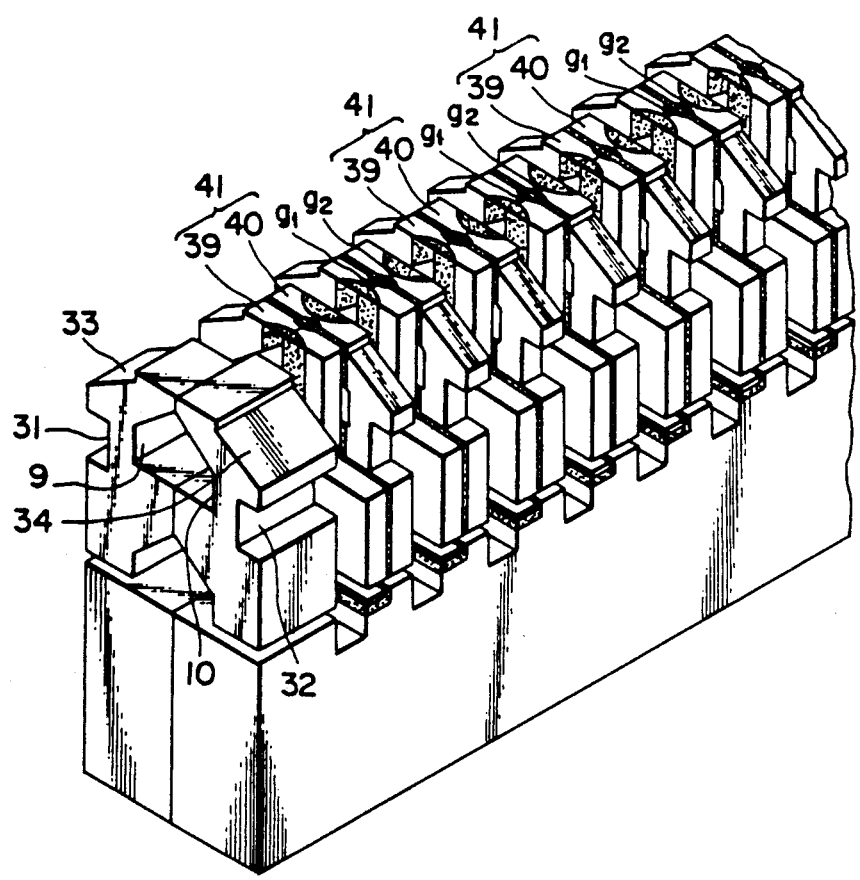

Consequently, as shown in FIG. 6, there are obtained a plurality of divided magnetic head elements 39, 40 where the comb-toothed portions 25 of one head element coupler 35 and the comb-toothed portions 26 of the other head element coupler 36 are joined together with the welding glass 37. That is, each pair of the joined magnetic head elements 39, 40 constitute a magnetic head 41 having two tracks.

Figure 7:
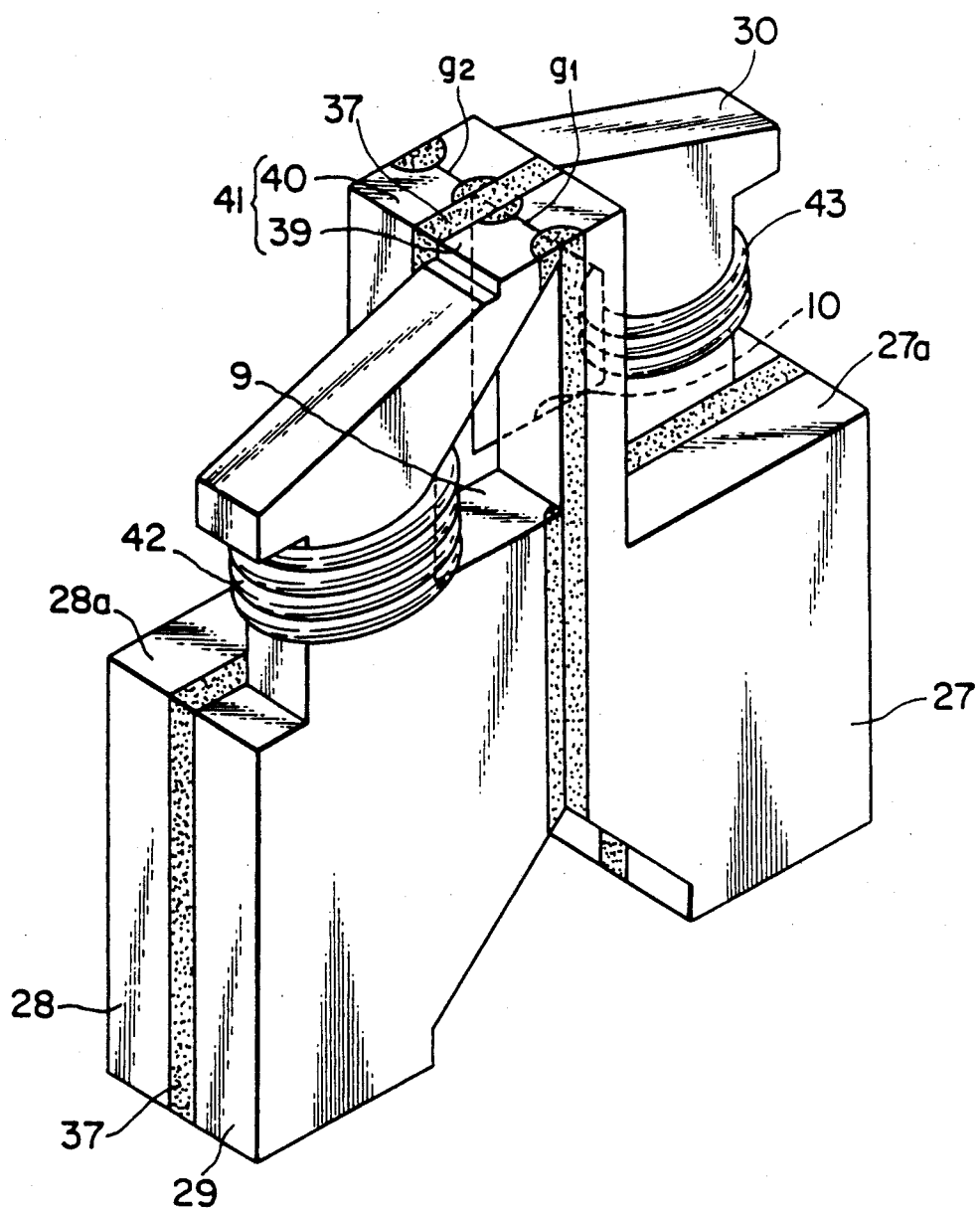
FIG. 7 is an enlarged perspective view of principal components in the magnetic head produced.
Figure 8:
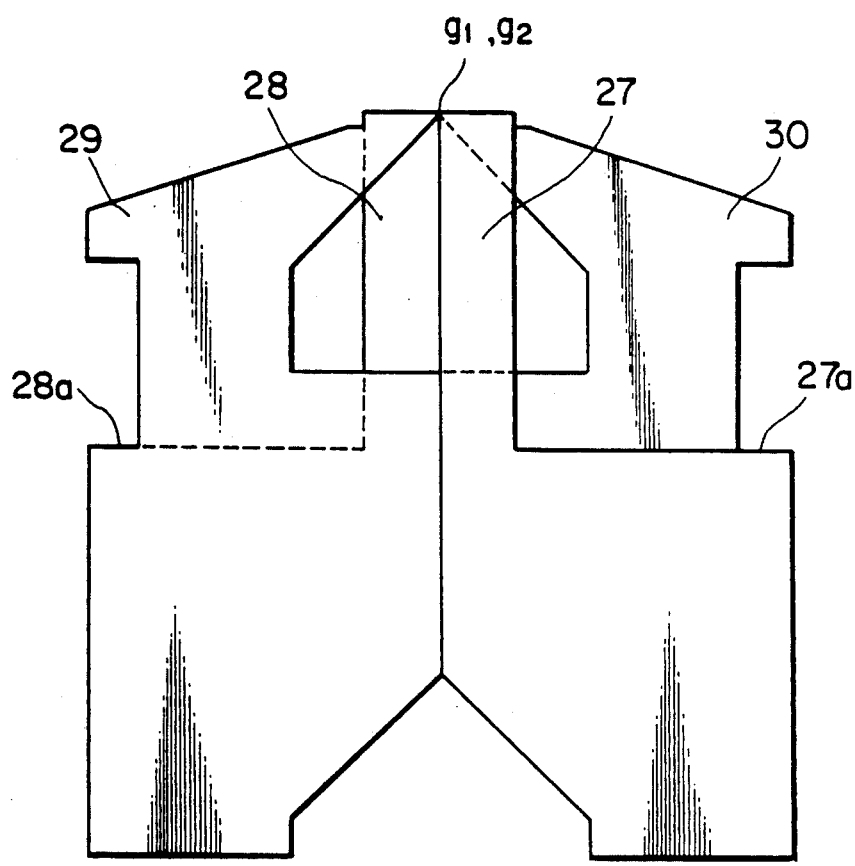
FIG. 8 is an enlarged side view of the principal components shown in FIG. 7.
Figure 9:
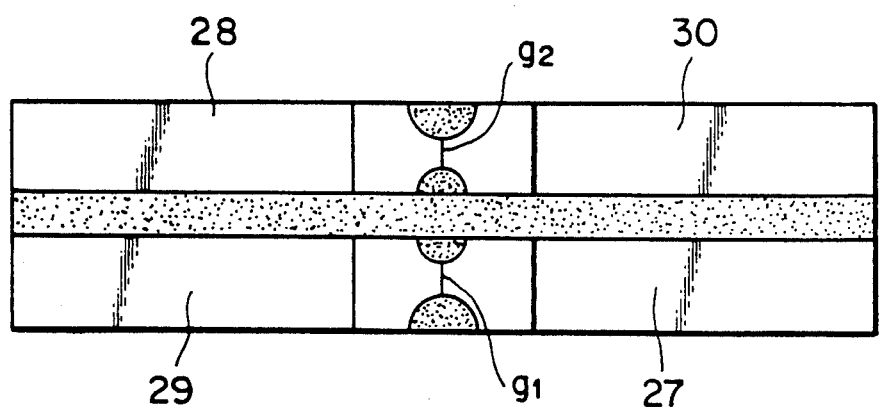
FIG. 9 is an enlarged plan view seen from the recording-medium slide surfaces.

In the magnetic head 41 thus produced, as shown in FIGS. 7 through 9, the magnetic gaps g1 g2 formed on the recording-medium slide surfaces 7, 8 of the magnetic head elements 39, 40 are aligned straight in the direction of the track width with high precision, and the coil grooves 9, 10 of the magnetic head elements 39, 40 are disposed on the mutually reverse sides with the magentic gaps g1 g2 positioned therebetween. Accordingingly, there exists neither an in-line error of the magnetic gaps g1 g2 nor a phase deviation between the gaps g1 g2, whereby any loss derived from the phase deviation of recorded and reproduced signals can be eliminated. Furthermore, the coil grooves 9, 10 are disposed on the mutually reverse sides with the magnetic gaps g1 g2 positioned therebetween, and the magnetic cores 27, 28 opposed respectively to the coil grooves 9, 10 are set backward to the positions where the coil grooves 9, 10 are partially open, so that the spaces required for winding coils in the grooves 9, 10 can be ensured to facilitate the winding operation. Thus, it becomes possible to narrow the interval of the magnetic head elements 39, 40 in the track-width direction without being restricted by the operation of winding the coils 42, 43.

Figure 10:
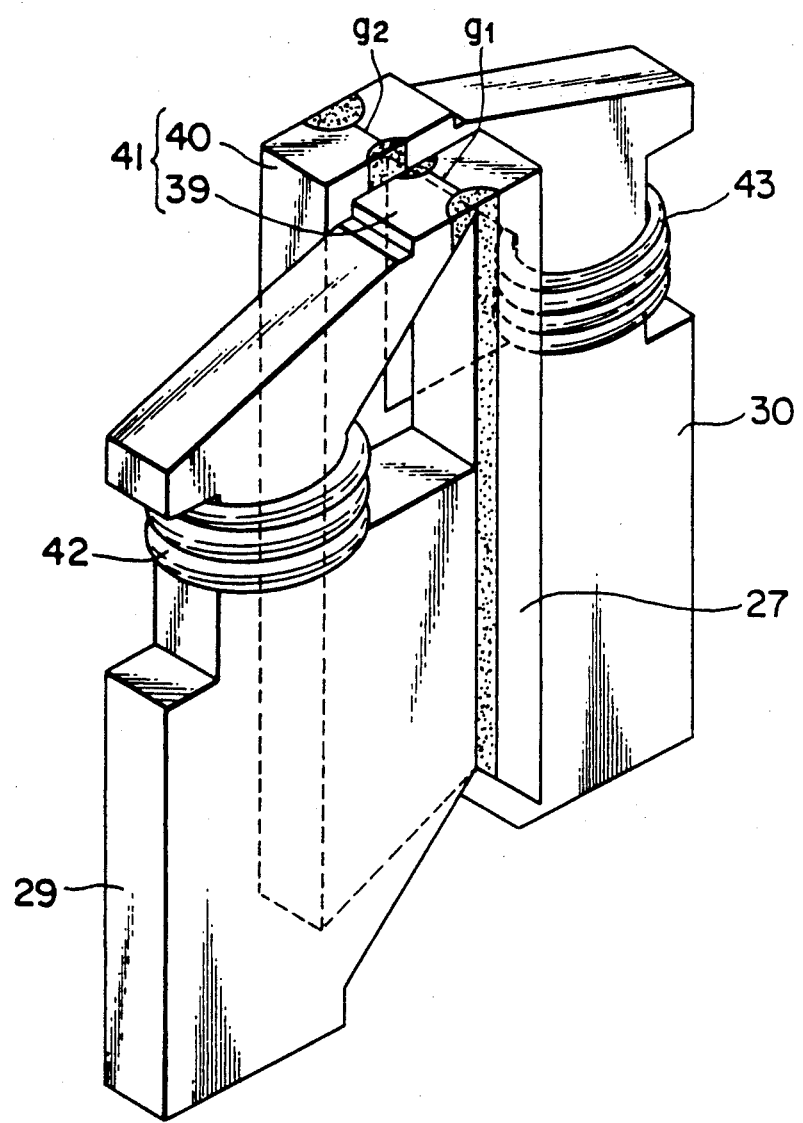
FIG. 10 is an enlarged perspective view of an exemplary magnetic head with improved cross-talk characteristics manufactured by the method of the present invention.

In the magnetic head 41, stepped portions 27a, 28a of the magnetic cores 27, 28 on one side opposed to the coil grooves 9, 10 may be cut off as illustrated in FIG. 10 to reduce the area of confrontation to the magnetic cores 29, 30 on the other side, thereby improving the cross-talk characteristics.

According to the present invention, as is obvious from the description given hereinabove, a pair of magnetic head elements so slit as to be comb-toothed are joined to each other in a state where the butt surfaces of the magnetic core blocks are butted to each other in a manner that the comb-toothed portions of one head element coupler are inserted into the slits in the other head element coupler. Therefore, the magnetic gaps are aligned straight in the direction of the track width to consequently prevent any in-line error or any phase deviation between the magnetic gaps. Thus, it becomes possible to eliminate the loss derived from the phase deviation of recorded and reproduced signals.

In addition, the present invention is so contrived that the coil grooves are disposed on the mutually reverse sides with the magnetic gaps positioned therebetween, and the thickness of the magnetic core block portion confronting the coil groove is set to be smaller than the depth of the coil groove, hence ensuring a sufficient winding space for the coil while realizing a narrow track interval.

Besides the above, in the magnetic head produced by the method of the present invention, two individually independent magnetic head elements are joined to each other by the use of welding glass, thereby enhancing the cross-talk characteristics.

Consequently, the present invention is capable of providing an improved bulk-type magnetic head wherein a high in-line precision of magnetic gaps and a narrow track structure can be achieved while sufficient coil winding spaces are maintained with further advantages including enhanced cross-talk characteristics and lower production cost.

What is claimed is:

1. A method of manufacturing a magnetic head, comprising the steps of:

joining first magnetic core blocks, where track-width limit slots and coil grooves orthogonal thereto are formed in butt surfaces, to second magnetic core blocks where track-width limit slots to be opposed to those in said first magnetic core blocks are formed in butt surfaces, said second magnetic core blocks being shorter than said first magnetic core blocks in the direction of extension of said track-width limit slots;

cutting said second magnetic core blocks in such a manner that the thickness of at least the portions thereof opposed to the coil grooves in said first magnetic core blocks becomes smaller than the depth of said coil grooves;

slitting and comb-toothing said joined first and second magnetic core blocks so that at least said second magnetic core blocks are divided and said first magnetic core blocks are partially left uncut to serve as coupling portions, thereby producing a pair of head element couplers; joining said pair of head element couplers to each other in a state where the comb-toothed portions of one head element coupler are inserted into the slits in the other head element coupler while the respective butt surfaces of said first magnetic core blocks are butted to each other; and severing at least the coupling portions of said first magnetic core blocks and thereby dividing the same into individual magnetic heads.

* * * * *